(12) United States Patent
Jensen

(10) Patent No.: US 11,999,657 B2
(45) Date of Patent: Jun. 4, 2024

(54) GEOPOLYMER EXPANSION ADDITIVE

(71) Applicant: Rosenblatt Innovations LLC, Petaluma, CA (US)

(72) Inventor: David I. Jensen, Santa Rosa, CA (US)

(73) Assignee: ROSENBLATT INNOVATIONS LLC, Petaluma, CA (US)

( * ) Notice: Subject to any disclaimer, the term of this patent is extended or adjusted under 35 U.S.C. 154(b) by 158 days.

(21) Appl. No.: 17/309,162

(22) PCT Filed: Oct. 31, 2019

(86) PCT No.: PCT/US2019/059140
§ 371 (c)(1),
(2) Date: Apr. 30, 2021

(87) PCT Pub. No.: WO2020/092754
PCT Pub. Date: May 7, 2020

(65) Prior Publication Data
US 2022/0002196 A1 Jan. 6, 2022

Related U.S. Application Data

(60) Provisional application No. 62/753,848, filed on Oct. 31, 2018.

(51) Int. Cl.
| | | |
|---|---|---|
| *C04B 22/04* | (2006.01) |
| *C04B 14/22* | (2006.01) |
| *C04B 18/04* | (2006.01) |
| *C04B 18/08* | (2006.01) |
| *C04B 18/14* | (2006.01) |
| *C04B 22/06* | (2006.01) |
| *C04B 22/10* | (2006.01) |
| *C04B 28/00* | (2006.01) |
| *C04B 38/02* | (2006.01) |

(52) U.S. Cl.
CPC ............ *C04B 22/04* (2013.01); *C04B 14/22* (2013.01); *C04B 18/0427* (2013.01); *C04B 18/08* (2013.01); *C04B 18/149* (2013.01); *C04B 22/064* (2013.01); *C04B 22/10* (2013.01); *C04B 28/006* (2013.01); *C04B 38/02* (2013.01)

(58) Field of Classification Search
CPC ..... C04B 22/04; C04B 14/22; C04B 18/0427; C04B 18/08; C04B 18/149; C04B 22/064; C04B 22/10; C04B 28/006; C04B 38/02; Y02P 40/10; Y02W 30/91
See application file for complete search history.

(56) References Cited

U.S. PATENT DOCUMENTS 10,011,530 B2 * 7/2018 Ihsan .................... C04B 28/008

FOREIGN PATENT DOCUMENTS

| DE | 4 009 967 A1 | 1/1992 | |
|---|---|---|---|
| EP | 0 562 651 A1 | 9/1993 | |
| WO | WO-2014166998 A1 * | 10/2014 | ........... C04B 28/006 |

* cited by examiner

*Primary Examiner* — Anthony J Green
(74) *Attorney, Agent, or Firm* — Andrew F. Young; Nolte Lackenbach Siegel

(57) ABSTRACT

A composition that controls and delays generation of foam in geopolymer pastes, mortars and concretes. Embodiments include a one-part anhydrous formula for the production of geopolymer foam that requires only the addition of water. The formula includes specific and variably designed admixtures that manage a time release delivery of alkali activation components, foaming agents, and blends thereof.

5 Claims, No Drawings

GEOPOLYMER EXPANSION ADDITIVE

BACKGROUND OF THE INVENTION

Technical Field

The present invention relates to lightweight, aerated concrete and (AAC) aerated, autoclaved, concrete used in building construction and more generally. thermally insulating material and fire resistant insulating material. More particularly, the invention relates to aerated, raw-ceramic binders, also referred to as aerated, alkaline activated binders (AAB), also referred to as geopolymer foam. Even more particularly, the present invention relates to a geopolymer foam admixture composition that includes time-release activation of foaming agents and geopolymer alkaline activators, as well as formulas and methods of managing and optimizing geopolymer foam expansion.

Background Art

Worldwide energy consumption is projected to grow as much as 40% in the coming 20 years. This is due not only to human population growth, but also to the increasing populations having access to electrical power. While such developments are highly desirable for any developing economies, the most concerning negative impacts related to such growth are increased atmospheric carbon dioxide and other toxic gases from fossil fuel consumption involved in generating electric power.

Moreover, building heating and cooling in the developing world represents one of the single largest sources of global energy consumption. Therefore, improving thermal efficiencies in conditioned space buildings may be critical to reducing growth in the global carbon footprint. The use of thermally insulating materials constitutes the most effective way to increase thermal efficiencies in conditioned space buildings. The materials consist substantially of variably refined polystyrene and polyurethane foams and glass fibers and to a lesser degree in soy-based foams, cellulose and asbestos fibers, vermiculite, and cork. These materials have become important in the global building industry, representing a 21 billion dollar (USD) market share in 2014 in Europe alone.

A shortcoming in the above-described thermally insulating materials is that the manufacturing and use of the most commonly used insulating materials is the degree to which they contribute to toxic atmospheric emissions (cork and vermiculite excepted). For example, the refinement of polystyrene foam involves the production of benzene and chlorofluorocarbons, and the finished material contains antioxidant and ignition retardant additives. Polyurethane refinement involves the production methyl isocyanates gas (MIC), a dangerous compound known for its connection to the tragic 1984 Union Carbide disaster in Bhopal, India, considered the world's worst industrial accident. Additionally polystyrene and fiberglass both require high temperature processing.

Furthermore polystyrene and polyurethane release lethally toxic and explosive fumes when burned. Increasingly, these flammable foams have been outlawed for use in conditioned space buildings in many jurisdictions throughout the United States, Europe, and Japan. Likewise, the use of asbestos fibers in building applications has been outlawed in most developed countries due to health concerns.

There is thus a growing interest and a demand for environmentally sound and sustainable building systems and net-carbon-zero construction to reduce future energy demands to sustainable levels. To achieve sustainable building systems, the building and manufacturing industries have been challenged to provide new thermal insulating materials produced from clean sustainable technologies.

Aerated Portland cement concrete is well known in the art, but it is extremely limited in its thermal mass reduction, thus limited in its application for thermal insulation. In addition to the very high energy demands of the calcining process used in producing Portland cement, aerated, autoclaved Portland cement concrete requires the additional energy demands in producing autoclave kiln temperatures for curing.

Ceramic foam is also known to be an alternative thermally insulating material. It is an extremely durable foam made from kiln fired ceramics. Ceramic foam manufacturing methods include internally impregnating various open celled petro chemical and soy-based foams (having low ignition points) with a ceramic slurry, then firing the impregnated foam in a kiln. This leaves only the fired ceramic material, which has an open celled porosity created by the pre-fired (low ignition) foam. It is a very costly production process, limited in size and to specific manufacturing conditions, and it requires high energy consumption and causes corresponding emissions from high temperature kilns and from the foam production.

Geopolymer condensate technology is also well known in the art. It is variously referred to as raw ceramic or alkaline activated polymer. Joseph Davidovits researched, developed, and patented many variations of what were termed alkali activated binders (AAB) in the early development phases (i.e., 1978). He coined the term "geopolymer." This followed decades of less successful research of alkali-activated polymer systems by others. The development of what are now most commonly referred to as "geopolymers" was initially motivated by its potential as a sustainable alternative to Portland cement and typical kiln-fired ceramics. The optimism was predicated on the understanding that the alkali-activated geopolymer condensates do not require the high temperature calcining or the kiln-firing process of Portland cement and typical ceramics. Geopolymers generally consist of aluminum silicate clays and alkali activators in the form of sodium silicate, sodium hydroxide, or potassium hydroxide solutions in variable ratios. Development of geopolymers since 1978 has increasingly utilized recycled industrial waste fly ash as a primary aluminum silicate component, further adding to carbon footprint reduction. Even so, geopolymers have not been significantly employed in the building industry due to their inconsistency, the cost of the raw materials, and the more complex handling and mixing requirements of a multi-part system.

More recently, the development of geopolymer foam (aka, "foamed geopolymers") represents a promising research field with high potential for developing sustainable and non-toxic thermal insulation materials. Geopolymer foam systems utilize various foaming agents that expand the volume of the polymer component with an aerated porosity. The foaming agents fall into two classes: gas producers and foam modifiers. The gas producers include, but are not limited to, metallic aluminum powder, zinc and copper powder, sodium percarbonate, sodium perborate, and hydrogen peroxide. The foam modifiers include various detergents containing surfactants.

The most effective foaming agents are gas-producing agents. Metallic aluminum and zinc powders produce hydrogen gas when mixed into the highly alkaline geopolymer systems. Sodium percarbonate, sodium perborate, and hydrogen peroxide produce oxygen.

The foam modifying detergent surfactants have both hydrophilic and hydrophobic components that reduces the surface tension of the water contained in the system to form bubbles. Surfactant foaming agents are used in three ways. One is pre-foaming, wherein the surfactant is added to water and mixed aggressively to form a pre-mix foam which is then mixed into a Portland cement or geopolymer concrete or paste binding system. Another approach, post foaming, involves adding the un-foamed surfactant to the binding system and then aggressively mixing the batch to form foam in the binding system. A third approach is to use the surfactant in conjunction with one of the gas-producing foaming agents to intensify and manage the cell size and foam structure generated by the gas production in the binding system.

Little to no heat generation is required and no toxic fumes are emitted in the production of geopolymer foam or in the production of its components. Moreover, geopolymer foam is extremely fire resistant and does not off gas when subjected to heat or flame. This makes geopolymer foam extremely well-suited as a replacement for petro chemical, soy-based, and other flammable foams in many conditioned space building applications.

The challenge in wholesale implementation and use of geopolymer foam in conditioned spaces resides in the way it is produced for job site applications. This is due the complexity of the system and the time sensitive nature of foam generation. Simply put, geopolymer foams have rapid set times. The curing and potential early-stiffening of geopolymer systems accelerate under heat and pressure, making geopolymers extremely challenging to pump with industry-standard mortar and grout pumps. This significantly limits options for job site delivery. Furthermore, geopolymer foam systems usually require at least a three-part mix, and after the alkaline component of the geopolymer is added to the aluminum silicate clays, typical geopolymer systems start to gel and harden in 10 to 20 minutes. Depending on water content, some will stiffen in five minutes or less, even while being agitated, and they will stiffen faster if not agitated. Then, once a "gas-producing" foaming agent is added to the geopolymer system, depending on the amount of the active material and the level of refinement, production of gas and foam expansion typically begins in only two to ten minutes. Retarders, including glucose, citric acid, dipotassium phosphate, colloidally dispersed clay (e.g., montmorillonite clay), and (BCH) 2-amino-2-norbornanecarboxylic acid, have been employed to slow the set time of geopolymer systems, but with marginal success. And that success depends on the sequence of their induction, the most effective involving introduction to the aluminum silicate clays prior to the addition of the alkali activator. But this only contributes to the sequential complexity to the mixing system and does not substantially retard the expansion of the system following inoculation with a gas-producing foaming agent.

The gas-producing foaming agents react with the alkalinity of the geopolymer. The higher the alkalinity, the more gas produced, and therefore the more foam and expansion generated; but also, the higher the alkalinity, the faster the geopolymer stiffens, therefore limiting expansion potentials. Furthermore, most of the gas-producing foaming agents also drive an exothermic reaction in the geopolymer, accelerating early stiffening and leaving little time for material placement, which is especially problematic for construction job site applications. Further still, lower density foams suitable for thermal insulation applications require higher amounts of foaming agents and alkali activation, thereby reducing the dormant time available for material placement and leaving little time for the material delivery of low density foams, even in controlled lab and/or manufacturing conditions.

There remains a need, therefore, for a geopolymer foam that addresses and resolves the above-described shortcomings and limitations.

DISCLOSURE OF INVENTION

It is thus a principal object of the present invention to provide compositions that control and delay the generation of foam in geopolymer pastes, mortars and concretes, and thereby expands the potential applications for geopolymer foam systems. Embodiments of the inventive composition include a one-part anhydrous formula for the production of geopolymer foam that requires only the addition of water. The formula includes specific and variably designed admixtures that manage a time release delivery of known alkali activation components and foaming agents and blends thereof.

The present invention provides a geopolymer having an embedded time-release control component for use in the production of geopolymer foam pastes, mortars, and concretes, comprising: (1) at least one dry powdered component; (2) at least one alkaline activator component; (3) water: and (4) an admixture of an alkaline activator or foaming agent, or a combination thereof, selected from coated aggregate, coated alkaline reactive media, and a blend of metallic aluminum powder, calcium carbonate, calcium oxides and hydroxides, Class C fly ash, blast furnace slag, and lime kiln dust, and combinations thereof, wherein the admixture provides a time release delivery of the at least one alkali activator component or foaming agents, such that after adding the water and mixing, the admixture prior to foam expansion holds its initial volume in a wet-mix dormant period between zero and 20 minutes, and once fully expanded through the production of foam reaches volumes of 1.5 to 4 times the dormant, pre-expanded volume; and wherein the foam density of a fully cured product made from the composition has a thermal resistance (IP) R rating from 0.5 R per inch to 6 R per inch, can withstand 1200 degrees F. without suffering structural decomposition or releasing toxic gasses.

It is further noted that the present invention provides a geopolymer wherein the at least one dry powdered component is a natural, manufactured and industrial waste aluminum silicate material.

It is a further objective of the present invention to provide an admixture for geopolymer foam systems that reduces early stiffening and lengthens the (unexpanded) dormant period of the wet mix long enough for material delivery with a peristaltic mortar and/or grout pump prior to foam production.

It is a further object of the present invention to provide an admixture technology for geopolymer foam systems capable of managing cell size and structure.

It is a further object of the present invention to provide a variably engineered additive for geopolymer foam systems capable of producing variable and controllable foam densities with a range of thermal resistance (IP) R ratings from 0.5 R per inch to 6 R per inch.

It is yet another object of the present invention to provide additives for a geopolymer foam system to produce a non-flammable geopolymer foam that can withstand direct flame generating a surface temperature exceeding 1600 degrees F. without toxic emissions, flame spread, or structural decomposition.

These objectives are realized in the method and composition of the present invention, which includes several novel method steps relating to component selection, sizing, blending, and coating, including:

First: steps for selecting, sizing, blending and refining reactive materials, including, but not limited to, anhydrous alkali materials, foaming agents, wetting agents, surfactants accelerators and retarders.

Second: steps for selecting, sizing and conditioning natural and manufactured lightweight and standard concrete and mortar aggregates.

Third: steps for selecting, blending, and applying temporary penetrating sealers waxes and coatings for water soluble, pH and thermal induced release. These include the use of water, heat and alkaline soluble penetrating sealants and coating materials, followed by more chemically stable coating materials for more extended time release.

Fourth: steps for selecting, sizing and blending anhydrous, reactive and non-reactive coating media.

Fifth: steps for coating the above-mentioned aggregates and particular-sized reactive media with variable blends of the above-identified wetting agents, coating media, reactive materials, sealants and coating materials. These steps are carried out by placing the components in a hydrating and dehydration mixing apparatus typically employed for coating aggregate media.

Sixth: steps comprising alternating sequences for coating anhydrous alkali activation materials and foaming agents with anhydrous coating media, wetting agents, and temporary and semi-permanent sealers and coatings in various dilution ratios and combinations, in addition to particular sequences for pre-soaking and coating porous and non-porous aggregates, combined with variable wetting agents, reactive materials, anhydrous coating media, temporary and semi-permanent sealant and coating materials in variable dilution ratios and combinations.

Seventh: method steps and apparatus for batching, mixing, inoculating, material deposition, product molding, and curing for geopolymer foam production and application.

Other novel features characteristic of the inventive composition, together with further objects and advantages thereof will be better understood from the following detailed description.

BEST MODE FOR CARRYING OUT THE INVENTION

The invention will be better understood and objects other than those set forth above will become apparent when consideration is given to the following detailed description thereof. The inventive admixture includes the following:

Group Classifications of Raw Materials for Geopolymer Foam Additives.

Group 1) Additive Accelerators. These are particles sized between 20 to 74 microns and are selected from the group consisting of:
1) Calcium Carbonate;
2) Calcium silicate;
3) Calcium hydrate;
4) Plaster;
5) Lime kiln dust (calcium oxide);
6) Blast furnace slag (BFS);
7) Class C fly ash;
8) Hydrated lime;
9) Portland cement; and
10) Combinations thereof.

Group 2) Retarders. These are particles sized between 20 to 200 microns and are selected from the group consisting of:
1) Citric acid;
2) Dipotassium phosphate;
3) Colloidally dispersed clay (e.g.; montmorillonite clay);
4) (BCH) 2-amino-2-norbornanecarboxylic acid;
5) Organosilane water repellent gel (alkoxysilane water-based emulsion); and
6) Combinations thereof.

Group 3) Coatable Anhydrous Foaming Agent Media. These are particles sized between 16 to 65 mesh and are selected from the group consisting of:
1) Metallic aluminum aggregate;
2) Sodium perborate;
3) Sodium percarbonate;
4) Detergent surfactants; and
5) Combinations thereof.

Group 4) Coatable Anhydrous Alkali Activation Media. These are particles sized between 16 and 65 mesh and are selected from the group consisting of:
1) Sodium metasilicate;
2) Sodium metasilicate pentahydrate;
3) Potassium silicate;
4) Other alkaline (basic) anhydrous sources; and
5) Combinations thereof.

Group 5) Coatable (Non-Expanded) Aggregates. These are particles sized between 1 mm and 10 mm:
1) Perlite aggregates (raw);
2) ASTM concrete sand and aggregates;
3) ASTM mortar sand;
4) Crushed silica sand; and
5) Combinations thereof.

Group 6) Coatable (Naturally Porous or Expanded) Lightweight Aggregate. These are particles sized between 1 mm and 10 mm and are selected from the group consisting of:
1) Expanded perlite;
2) Vermiculite;
3) Expanded shale (and the like);
4) Pumice; and
5) Combinations thereof.

Group 7) Coatable (Manufactured) Lightweight Aggregate. These are particles sized between 1 mm and 10 mm and are selected from the group consisting of:
1) Expanded glass aggregate;
2) Expanded ceramic aggregate (Poravor);
3) Expanded polystyrene beads;
4) Recycled polystyrene aggregate; and
5) Combinations thereof.

Group 8) Non-Reactive Coating Media. These are particles sized between 3 and 45 microns and are selected from the group consisting of:
1) Natural and manufactured aluminum silicate;
2) Type N pozzolans;
3) Class F fly ash;
4) Ground silica;
5) Silica fume;
6) Rice hull ash;
7) Portland cement;
8) Gypsum;
9) Ground fired clay bisque;
10) Milled soda lime glass;
11) Talc; and
12) Combinations thereof.

Group 9) Reactive Coating Media. These are particles sized between 3 and 45 microns and are selected from the group consisting of:
1) Sodium metasilicate; (alkaline activator)
2) Sodium metasilicate pentahydrate; (alkaline activator)
3) Potassium silicate; (alkaline activator)
4) Other basic anhydrous sources;
5) Metallic aluminum powder; (foaming agent)
6) Sodium perborate; (foaming agent)
7) Sodium percarbonate; (foaming agent)
8) Detergent surfactants; (foaming agent)
9) Calcium carbonate; (set accelerator)
10) Calcium silicate; (set accelerator)
11) Calcium hydrate; (set accelerator)
12) Portland cement; (set accelerator)
13) Plaster; (set accelerator)
14) Lime kiln dust (calcium oxide); (set accelerator)
15) Ground granulated blast furnace slag (GGBFS); (set accelerator)
16) Class C fly ash; (set accelerator)
17) Hydrated lime; (set accelerator)
18) Dipotassium phosphate; (surfactant)
19) Colloidally dispersed clay (e.g.; montmorillonite clay); (set retarder)
20) (BCH) 2-amino-2-norbornanecarboxylic acid; (set retarder) and
21) Combinations thereof.

Group 10) Wetting and Sticking Agents selected from the group consisting of:
1) Water;
2) Acrylic modifiers;
3) Plasticizers;
4) Diluted alcohol based, penetrating sealers with silicone solids;
5) Diluted petro chemical solvent base, penetrating sealers with silicone solids;
6) Diluted alkali solutions;
7) Water born soil surfactants;
8) Diluted water born acrylics, latex and urethanes paints and sealers;
9) Alcohols;
10) Shellac;
11) Petro chemical solvents and oils;
12) Oil-based plants and mineral oils;
13) Polyurethane coating; and
14) Lacquer.

Group 11) Temporary Coatings: These including water, alkaline and heat soluble penetrating sealers and coatings, selected from the group consisting of:
1) Alcohol-based, penetrating sealers with silicone solids;
2) Acrylic modifiers;
3) Concrete densifiers and conditioners (silicate densifiers);
4) Latex;
5) Acrylics;
6) Water born urethanes;
7) Lacquer;
8) Polyurethanes;
9) Polyurethanes with azo bonds;
10) Shellac;
11) Paraffin and Mineral waxes;
12) Paraffin and microcrystalline wax;
13) Lanolin;
14) Hydrogels;
15) Propyline glycal and corn protein;
16) Ethylenic polymers, e.g., polyethylene and polyetheresters;
17) PSS (sodium polystyrene sulfonate); and
18) PAH; poly(allylamine hydrochloride).

Group 12) Semi-Permanent Coatings: These are chemically resistant penetrating sealers and coatings, selected from the group consisting of:
1) Petro chemical Solvent base, penetrating sealers with silicone solids;
2) Hydrophobic sealers;
3) Polyurethane;
4) Spar urethane;
5) Vinyl;
6) Epoxy;
7) Acrylic;
8) Lacquer;
9) Oil-based paints and varnishes;
10) Paraffin and Mineral waxes;
11) Paraffin and microcrystalline wax;
12) Lanolin;
13) Hydrogels;
14) Propyline glycal and corn protein;
15) Ethylenic polymers, e.g., polyethylene and polyetheresters;
16) PSS (sodium polystyrene sulfonate); and
17) PAH; poly(allylamine hydrochloride).

Coating Apparatus: The coating apparatus employed in the production of geopolymer foam using the inventive compositions may be any of a number of hydrating and dehydrating mixing apparatus commonly configured and employed for coating aggregate media. The mixing apparatus may vary in method types, from a rotating cylinder to a tumble mixer having fixed blades approximating a horizontally disposed cylindrical drum, to a rotating blade or paddle mixer having a single axis, or a multiple axis planetary type configuration approximating a vertical or horizontally disposed cylindrical drum. The coating apparatus preferably has varying degrees of manual facilitation and/or automation for wet and dry material deposition and drying capacities involving heated airflow.

Production System for Geopolymer Foam: The inventive admixture and foam compositions made using the admixture are contemplated for industrial and commercial use for producing large volumes of expanded geopolymer foam pieces—blocks, for example—intended for a subsequent milling process, wherein products or product parts are milled from large blocks of expanded foam.

Production Phases: Production includes three general phases, including a first phase, Phase 1, which involves the batching and mixing of the geopolymer and the inoculation of the geopolymer with a foam forming agent and the integration of the foaming agent throughout the geopolymer pre-mix.

Phase 2 is a deposition phase. This phase is carried out using a novel mixer and mold apparatus, described in Patent Application Ser. No. 62/753,788, now PCT Pat. Appl. Ser. No. PCT/US19/59119, that facilitates the immediate deposition of the inoculated geopolymer into a containment mold to allow immediate foam expansion and the initial set of a molded product without having to move the inoculated geopolymer wet mix from mixer to mold. [PCT Pat. Appl. Ser. No. PCT/US19/59119 is incorporated in its entirety by reference herein.]

Phase 3 involves the mobilization of the containment mold from the deposition/mixing station through a production loop which begins with a curing environment for the initial (in-mold) cure of a millable product, followed by a brief separation from the curing environment for demolding, product removal, and mold reassembly, returning, and then routing the demolded product back to the curing environment for a final cure and recirculation of the containment mold through the production loop. This system is intended to provide a millable foam stock to a production facility equipped to cut and/or mill product from the foam stock.

Methods of making the geopolymer foam additive using the material groups and production methods:

In embodiments, to reduce water demand, the porous aggregates from Group 6 may be coated with specific amounts of wetting agents from Group 10 and temporary and semi-permanent sealers and coatings from Groups 11 and 12, applied in alternating depositions with specific ratios of coating media from Group 8 in a hydrating/dehydration mixing apparatus.

In embodiments, the alkali activator media from Group 4 may be coated with specific amounts of non-reactive coating media from Groups 8 and 9, in alternating applications, with wetting agents from Group 10 and temporary and semi-permanent sealers and coatings from Groups 11 and 12, all in a hydrating/dehydration mixing apparatus, as described above.

Further, in embodiments, the 16-65 mesh foaming agent media from Group 3 may be coated with specific amounts of reactive and non-reactive coating media from Groups 8 and 9, in alternating applications, with the wetting agents from Group 10, and the temporary and semi-permanent sealers and coatings from Groups 11 and 12, using the above-described hydrating/dehydration mixing apparatus.

In still other embodiments, a second seed layer may be over-coated on the reactive media. That is, the coated 16-65 mesh alkali activator media may be seeded with specific amounts of foaming agent media from Group 3, mixed in specific ratios with non-reactive coating media from Group 8, and applied in alternating depositions with wetting agents and temporary coatings from Groups 10 and 11. Once cured, the seed layer may be coated with temporary and semi-permanent coatings from Groups 11 and 12 using the hydrating/dehydration mixing apparatus.

Still further, in embodiments, the coated aggregate may be seeded with the alkali coating media by applying, in order, specific amounts of wetting agents from Group 10, then specific amounts of alkali coating media from Group 9, including but not limited to, sodium metasilicate and pentahydrate, mixed in specific ratios with non-reactive coating media from Group 8, and then alternating additional applications with wetting agents and temporary coatings from Groups 10 and 11, all in the hydrating and dehydration mixing apparatus.

Coated aggregate may also be seeded with a foaming agent coating media, by starting with specific amounts of wetting agents from Group 10, then specific amounts of foaming agent coating media from Group 9, including but not limited to, metallic aluminum powder, zinc powder, sodium perborate, sodium percarbonate and detergent surfactants, each and all mixed in specific ratios with non-reactive coating media from Group 8, and applied in alternating applications with the wetting agents and temporary coatings from Groups 10 and 11. Again, this process takes place in the hydrating/dehydration mixing apparatus.

The coated aggregate may also be double seeded. This is done by first seeding it with specific amounts of the alkali coating media from Group 9, mixed in specific ratios with non-reactive coating media from Group 8, applied in alternating depositions with the wetting agents and the temporary and semi-permanent coatings from Groups 10, 11 and 12, then applying a second seed layer over the first, coated seed layer with specific amounts of foaming agent media from Group 3, mixed in specific ratios with non-reactive coating media from Group 8, also applied in alternating deposition with the wetting agents and the temporary and semi-permanent coatings from Groups 10, 11 and 12. Once cured, the last seed layer is coated with temporary and semi-permanent coatings from Groups 11 and 12 in the hydrating/dehydration mixing apparatus.

Additional outer shell coatings for prolonged dormant periods may also be applied to the pre-seeded and coated aggregate and media alternatives using specific amounts of temporary and semi-permanent sealers and coatings. Depending on the desired time delay, alternating applications of wetting agents from Group 10 and non-reactive coating media from Group 8 are applied, and then the temporary and/or semi-permanent sealers and coatings from Groups 9 and 12 are applied, all in the hydrating and dehydration mixing apparatus.

Description of the time control of geopolymer foam expansion in a one-part geopolymer drymix requiring only the addition of water to initiate.

The following formulas and methods are directed to producing a lightweight aggregate with an embedded time release, anhydrous, alkaline, reactive material and/or a foaming agent. It is assumed that an aggregate coating mixer is employed in the process, preferably an appropriately sized tumble mixer having a 10 to 40 rpm range with heated air flow. Additionally, it is assumed that the curing phase of the production process is performed in an appropriate coated aggregate curing environment, preferably an automated or manually loaded storage facility maintaining a consistent, heated air flow of 90 to 150 degrees F. In practice, a curing media is dispensed in contained volumes having 2-6" maximum depth and an appropriately variable footprint, vertically stacked with an air space between each contained volume equal to the vertical depth of the contained volume. For larger scale production, large capacity, air conditioned tumblers may be employed to expedite dehydration and curing.

Material components and ratios for seeded aggregate, AG1 and AG2, and coated reactive media, M1 and M2:

A) Lightweight aggregate: 1-2 mm expanded glass aggregate;
B) METSO BEADS®: 16-65 mesh anhydrous sodium metasilicate [METSO BEADS is a registered trademark of PQ Corporation of Valley Forge, Pennsylvania];
C) Wetting and/or sticking agent: shellac and/or lacquer aerosol spray having a ratio of shellac and/or lacquer solids to delivery solvents typically employed in aerosol delivery systems, or the higher ratio of solids typical of an airless spray system;

D) Alkaline (Base) seed: 3 parts 200 mesh minus ground (Metso Beads) sodium metasilicate and 1 part 200 to 325 mesh minus class F fly ash;

E) Coating media; 200 to 325 mesh minus class F fly ash;

F) Coating binder: Lacquer, aerosol spray having a ratio of lacquer solids to delivery solvents typically employed in aerosol delivery systems, or the higher solids of an airless spray system;

G) Foaming agent seed: 1 part 200 mesh minus metallic aluminum powder to 4 parts 200 to 325 mesh minus type F fly ash; and H) Outer shell coating: Spar urethane spray having a ratio of polyurethane solids to delivery solvents that are typically employed in aerosol delivery systems, or the ratios typically employed in airless spray systems.

Method steps of seeded, time release aggregate AG1. Referring to the alphabetically defined composition components above, the following are method steps for producing seeded time-release aggregate AG1:

1) Dispense 200 parts by weight of (A) lightweight aggregate into a tumble mixer, turn mixer on and spray 20 to 40 parts by weight (C) shellac aerosol as the wetting and/or sticking agent onto the tumbling aggregate;
2) Dispense 200 parts by weight (D) base seed slowly and evenly to the tumbling, wetted-out aggregate, and spray an additional 20 to 30 parts by weight (C) shellac aerosol;
3) Tumble dry in heated air flow mixer for a time period between 5 and 30 minutes;
4) Slowly alternate depositions of (C) shellac aerosol and (E) coating media for an cumulative build-up totaling 50 parts of each;
5) Tumble dry in heated air flow mixer for a time period between 5 and 30 minutes;
6) Place batch in curing environment for 3 to 12 hours;
7) Dispense batch back into the coating mixer for slow intermittent spray depositions totaling 150 to 300 parts (F) lacquer coating binder;
8) Tumble dry in heated air flow mixer for a time period between 5 and 30 minutes;
9) Place batch in curing environment for 3 to 12 hours;
10) Dispense batch back into the coating mixer and spray 30 to 60 parts by weight (C) lacquer (wetting and/or sticking agent) onto the tumbling aggregate; slowly alternate depositions of (E) coating media and (F) lacquer coating binder for an cumulative build-up totaling 200 parts coating media and 300 parts coating binder;
11) Tumble dry in heated air flow mixer for a time period between 5 and 30 minutes;
12) Place batch in curing environment for 3 to 12 hours;
13) Dispense batch back into the coating mixer and spray 30 to 60 parts by weight (C) lacquer wetting and/or sticking agent onto the tumbling aggregate; slowly and evenly deposit 100 parts by weight (G) foaming agent seed onto the tumbling, wetted-out aggregate until evenly coated, and then spray 130 to 230 parts by weight (F) lacquer coating binder;
14) Tumble dry in heated air flow mixer for a time period between 5 and 30 minutes; and
15) Place batch in curing environment for 3 to 12 hours.

Additional method steps to produce seeded, time release aggregate AG2:

16) Dispense batch referenced above back into the coating mixer and spray 100 to 300 parts by weight (H) outer shell coating;
17) Tumble dry in heated air flow mixer for a time period between 5 and 30 minutes; and
18) Place batch in curing environment for 3 to 12 hours.

Method steps for coated, reactive media M1. Still referring to the alphabetically defined composition components above, the following method steps are employed to produce coated reactive media, M1:

1) Dispense 200 parts by weight of (B) Metso Beads into the tumble mixer and then spray 10 to 20 parts by weight (C) shellac aerosol wetting and/or sticking agent onto the tumbling aggregate; then dispense 20-30 parts (E) coating media; slowly and evenly to the tumbling, wetted-out Metso Beads then follow with alternate depositions of (C) shellac aerosol as wetting agent and (E) coating media totaling at 30-40 parts (C) 40-50 parts (E);
2) Tumble dry in heated air flow mixer for a time period between 5 and 30 minutes;
3) Place batch in curing environment for 3 to 12 hours;
4) Dispense coated media back into coating mixer; spray 10-20 parts (C) lacquer wetting agent onto tumbling media then dispense 20-40 parts (E) coating media and spray 60-80 parts (F) lacquer coating binder;
5) Tumble dry in heated air flow mixer for a time period between 5 and 30 minutes;
6) Move batch to curing environment for 3 to 12 hours;
7) Dispense media back into coating mixer (now 300 parts by weight) spray 20-40 parts (C) lacquer wetting agent and dispense 100 parts (G) Foaming agent blend until evenly coated then spray 100-120 parts by weight (F) Lacquer, coating binder onto the coated media;
8) Tumble dry in heated air flow mixer for a time period between 5 and 30 minutes; and
9) Move batch to curing environment for 3 to 12 hours;

Additional Method Steps for coated, reactive media M2:

10) Dispense batch referenced above back into the coating mixer and spray 40-50 parts by weight (H) outer shell coating;
11) Tumble dry in heated air flow mixer for a time period between 5 and 30 minutes; and
12) Place batch in curing environment for 3 to 12 hours.

Formulas for geopolymer foam condensates with prolonged dormant periods using the foam forming media:

As used herein, "dormant period" means a period of time wherein the production of foam and the initial setting of the geopolymer is delayed in a geopolymer foam, condensate system seeded with the above time-release foaming agents.

Formula #1: In an embodiment, a geopolymer foam condensate with a 10-minute dormant period may be produced by mixing:

1) 360 grams 325 mesh minus Type F fly ash;
2) 80 grams rice hull ash;
3) 750 grams of AG1 seeded, time release aggregate referenced above; and
4) 400 grams water.

The performance characteristics for Formula for #1 include the following:

5) Wet dormant volume=93 cubic inches;
6) 10 min (pre-expansion) dormancy;
7) Expansion period interval 12 minutes;
8) Post expansion volume 178 cubic inches; and
9) 92% expansion.

Formula #2: In an embodiment, a geopolymer foam condensate having a 20-minute dormant period may be produced by mixing:

1) 360 grams 325 mesh minus Type F fly ash;
2) 80 grams rice hull ash;
3) 750 grams of AG2, seeded, time release aggregate referenced above; and
4) 400 grams water.

The performance characteristics for the geopolymer foam of Formula #2 include:

1) Wet dormant volume=93 cubic inches;
2) 20 min (pre-expansion) dormancy;
3) Expansion period interval 30 minutes;
4) Post expansion volume 153 cubic inches; and
5) 65% expansion.

Formula #3: In another embodiment, a geopolymer foam condensate having a 5 minute dormant period may be produced by mixing:

1) 360 grams 325 mesh minus Type F fly ash;
2) 80 grams rice hull ash;
3) 300 grams of M1, coated reactive media referenced above; and
4) 240 grams water.

The performance characteristics for the geopolymer foam of Formula #3 include:
1) Wet dormant volume=36 cubic inches;
2) 5 min (pre-expansion) dormancy;
3) Expansion period interval 3 minutes;
4) Post expansion volume 234 cubic inches; and
5) 550% expansion.

Formula #4: In another embodiment, a geopolymer foam condensate having an 8 minute dormancy period for a coated aggregate may be produced by mixing:
1) 360 grams 325 mesh minus Type F fly ash;
2) 80 grams rice hull ash;
3) 300 grams of M2, coated reactive media, referenced above; and
4) 240 grams water.

The performance characteristics for Formula #4 include:
1) Wet dormant volume=36 cubic inches;
2) 8 min (pre-expansion) dormancy;
3) Expansion period interval 8 minutes;
4) Post expansion volume 144 cubic inches; and
5) 300% expansion.

Detailed Description for a 4-component geopolymer foam mix designed for the production system for geopolymer foam in manufacturing applications:

The following provides a method and formula for a four-component geopolymer foam mix, wherein the wet-mix is designed to remain plastic (dormant) and free of early stiffening for at least 20 minutes prior to inoculation with foaming agent. Foaming agent blends can be formulated for immediate foam expansion and significantly delayed foam expansions. The component list below outlines two foaming agent applications, including F1, which is an application calling for a formula that produces immediate and rapid expansion, engineered for the above disclosed Production System for geopolymer foam in manufacturing applications. The deposition, mixing, inoculation and expansion is facilitated directly to a containment mold. In addition to a foaming agent this formula includes geopolymer set accelerators designed to arrest rapid expansion at its peak. A second application, F2, calls for a significantly delayed expansion for circumstances in which pumping the material prior to foam expansion is required. The four formula components include:

1) Dry Solids: Fly ash and/or aluminum silicate clays sized at 200 to 325 mesh minus and lightweight aggregates sized between 0.5 and 4 mm with aggregate to clay volume ratios of (1:1) and (1.5:1);
2) Base solution—sodium silicate D liquid solution 44.1% solids, and sodium or potassium hydroxide liquid solution of 50% solids and specific fibers and methods of dispersing fibers in base solution;
3) Water and/or wetting agents; and
4) Foaming agent: Foaming agent additive formula F1 is a blend consisting of 1 part metallic aluminum powder sized from 200 to 325 mesh minus and (0 to 4 parts) calcium carbonate and (0 to 4) calcium oxides and hydroxides, (0 to 4 parts) Class C fly ash, BFS (or GGBFS), and LKD, (lime kiln dust). Foaming agent additive formula F2 is either one of the above-described seeded, time release aggregates or one of the above-described coated reactive media, or a blend thereof Method Steps:
1) Step 1) Batch, independently and in order, appropriate amounts of water, dry solids, lightweight aggregates (if desired), fibers (if desired) and lastly the base solution;
2) Step 2) Mix base solution components together and pre-disperse fibers in base solution with a paddle type mixer;
3) Step 3) Mix dry solid components together, add water and mix thoroughly; and
4) Step 4) Inoculation; add F1 foaming agent and mix thoroughly for expanding directly into a mold at a production facility. For complicated material placement or pumping pre-expanded mix at a jobsite add variables of F2 instead of F1.

Formula #5: In embodiments, formula ratios that produce immediate expansion for manufacturing applications may be provided, including:

Dry Solids:
1) 74 parts fly ash; and
2) Equal volume (weight-to-volume) to fly ash of (1 to 2 mm) expanded glass aggregate.

Base solution:
1) 33 parts sodium silicate D 44.1% solids solution;
2) 17 parts sodium hydroxide 50% solution;
3) 4-7 mm Fiber; 0-10% of fly ash by weight; and
4) Water: 45 parts by weight;

Foaming agent additive for F1 Application:
1) 3.6 parts class C ash;
2) 3.6 parts BFS;
3) 3.6 parts LKD;
4) 0.4 parts Metallic aluminum powder;

The performance characteristics for Formula #5 include:
1) 20 minutes of original plasticity with early stiffening prior to inoculation;
2) Foam expansion within 1-3 minutes after inoculation;
3) 6-8 minute duration of expansion; and
4) 120 to 160% volume expansion.
5) Note; larger dose ratios of metalic aluminum powder can produce expansions up to 350%

Formula #6: In embodiments, formula ratios for a pumpable mix include:

Dry Solids:
1) 85 parts fly ash; and
2) Equal volume to fly ash of (1 to 2 mm) expanded glass aggregate Base solution:
1) 21 parts sodium silicate D 44.1% solids solution;
2) 13 parts sodium hydroxide 50% solution;
3) 4-7 mm Fiber; 0-10% of fly ash by weight;
4) Water: 45 parts by weight; and Foaming agent additive for F2 application: 16 parts coated reactive media M2.

The performance characteristics for Formula #6 include:
1) 30 minutes of original plasticity with early stiffening prior to inoculation;
2) Foam expansion starts within 10 to 15 minutes after inoculation;
3) 10 to 15 minute duration of expansion; and
4) 90 to 120% volume expansion, pumped pre-expanded mix with 2" peristaltic GFRC pump through 60 ft. of hose and 12 ft elevation to expand and fill an 8 foot wall.

The foregoing disclosure is sufficient to enable those with skill in the relevant art to practice the invention without undue experimentation. The disclosure further provides the best mode of practicing the invention now contemplated by the inventor.

What is claimed as invention is:

1. A geopolymer having an embedded time-release control of chemically reactive, activation components the time-controlled activation of geopolymer foam pastes, mortars, and concretes, comprising:
   (1) at least one dry powdered component;
   (2) at least one alkaline activator component;
   (3) at least one non-reactive aggregate;
   (4) water;
   (5) at least one foaming agent; and
   (6) an admixture including at least one aggregate coated with at least one coat of wetting and sticking agent which is in turn coated by at least one reactive coating media, which is in turn coated by at least one non-reactive coating media to create a protective shell around said reactive coating media and provide a controlled time-release delivery of said reactive components, whereby said geopolymer holds an initial wet-batch volume prior to the production of foam and the initial setting of said geopolymer in a dormant period between zero and 20 minutes, and once fully expanded through the production of foam reaches volumes of 1.5 to 4 times the dormant, pre-expanded volume; and
   wherein the foam density of a fully cured product made from said composition has a thermal resistance (IP) R rating from 0.5 R per inch to 6 R per inch, can withstand 1200 degrees F. without suffering structural decomposition or releasing toxic gasses.

2. The geopolymer of claim 1, wherein said at least one dry powdered component is selected from the group consisting of type N pozzolans, Class F fly ash, Class C fly ash, Portland cement, Gypsum, GGBFS, silica fume, rice hull ash, ground silica, ground fired clay bisque, milled soda lime glass, and talc, and combinations thereof.

3. The geopolymer of claim 1, further including at least one non-reactive aggregate selected from the group consisting of expanded perlite, expanded glass aggregate, expanded ceramic aggregate, pumice, silica sand, expanded polystyrene beads, recycled polystyrene aggregate, and combinations thereof.

4. The geopolymer of claim 1, wherein said aggregate of said admixture component is a reactive aggregate coated with a layer of shellac, which is in turn coated with a layer of a lacquer coating binder, which is then coated with a layer of lacquer, and then finally dried.

5. The geopolymer of claim 1, wherein said aggregate of said admixture component further includes a final coat of a non-reactive coating media and a semi-permanent coating material.

* * * * *